United States Patent
Rosén et al.

(10) Patent No.: US 12,044,425 B2
(45) Date of Patent: Jul. 23, 2024

(54) THERMAL ENERGY DISTRIBUTION SYSTEM AND CONTROL METHOD THEREOF

(71) Applicant: E.ON SVERIGE AB, Malmo (SE)

(72) Inventors: Per Rosén, Lund (SE); Jacob Skogstrom, Lomma (SE); Fredrik Rosenqvist, Helsingborg (SE)

(73) Assignee: E.ON SVERIGE AB, Malmo (SE)

( * ) Notice: Subject to any disclaimer, the term of this patent is extended or adjusted under 35 U.S.C. 154(b) by 0 days.

(21) Appl. No.: 17/250,984

(22) PCT Filed: Oct. 2, 2019

(86) PCT No.: PCT/EP2019/076684
§ 371 (c)(1),
(2) Date: Apr. 7, 2021

(87) PCT Pub. No.: WO2020/074337
PCT Pub. Date: Apr. 16, 2020

(65) Prior Publication Data
US 2021/0341167 A1      Nov. 4, 2021

(30) Foreign Application Priority Data
Oct. 8, 2018   (EP) ..................................... 18199127

(51) Int. Cl.
*G05B 13/02*        (2006.01)
*F24F 11/65*        (2018.01)
(52) U.S. Cl.
CPC ............ *F24F 11/65* (2018.01); *G05B 13/026* (2013.01)
(58) Field of Classification Search
None
See application file for complete search history.

(56) References Cited

U.S. PATENT DOCUMENTS

| 11,874,014 B2 * | 1/2024 | Rosén ...................... F24F 11/83 |
| 11,927,930 B2 * | 3/2024 | Rosén ................... G06Q 10/063 |

(Continued)

FOREIGN PATENT DOCUMENTS

| CA | 3024775 A1 * | 1/2018 | ........... F24D 10/003 |
| CN | 102721104 | 10/2012 | |

(Continued)

OTHER PUBLICATIONS

International Search Report and Written Opinion of PCT/EP2019/076684, dared Jan. 24, 2020, in 18 pages.

*Primary Examiner* — Jennifer L Norton
(74) *Attorney, Agent, or Firm* — Knobbe, Martens, Olson & Bear, LLP

(57) ABSTRACT

The disclosure relates to a method for controlling a thermal energy distribution system, the method comprising: —determining forecast data pertaining to expected overall outtake of heat and/or cooling over time from a distribution grid by local distribution systems connected to the distribution grid, and to expected production capacity of heat and/or cooling in one or more production plants, —determining, at a control server, a time resolved control signal, the control signal being based on forecast data and being associated with at least one local control unit, —sending the control signal from the control server to the associated local control unit, —receiving the control signal at the associated local control unit, —regulating over time, in response to the control signal, the outtake of heat and/or cooling of the local distribution system from the distribution grid. The thermal energy distribution system is also claimed.

10 Claims, 3 Drawing Sheets

(56) References Cited

U.S. PATENT DOCUMENTS

| | | | | |
|---|---|---|---|---|
| 2016/0334116 A1* | 11/2016 | Zaynulin | ............... | F24D 10/003 |
| 2018/0259196 A1* | 9/2018 | Rosén | ................... | F24D 10/003 |
| 2019/0154288 A1* | 5/2019 | Adirim | .................. | F24D 10/00 |
| 2020/0096205 A1* | 3/2020 | Rosén | ..................... | F01K 9/003 |
| 2021/0088227 A1* | 3/2021 | Rosén | ................. | F24D 19/1006 |
| 2021/0231319 A1* | 7/2021 | Rosén | ................... | F24D 10/003 |
| 2021/0381715 A1* | 12/2021 | Rosén | ..................... | F24F 11/67 |
| 2022/0243928 A1* | 8/2022 | Rosén | ..................... | F24D 10/003 |
| 2022/0364757 A1* | 11/2022 | Cimberio | ............... | F24F 11/63 |
| 2023/0213212 A1* | 7/2023 | Lindoff | ................. | F24D 10/003 |
| | | | | 237/8 R |
| 2023/0235897 A1* | 7/2023 | Li | ....................... | F24D 19/1006 |
| | | | | 237/13 |

FOREIGN PATENT DOCUMENTS

| | | | | |
|---|---|---|---|---|
| CN | 104791903 A | 7/2015 | | |
| CN | 108510118 A | 9/2018 | | |
| CN | 108604310 A | 9/2018 | | |
| EP | 2573474 A1 | 3/2013 | | |
| EP | 2664864 | 11/2013 | | |
| EP | 3082010 A1 * | 10/2016 | ......... | F24D 19/1006 |
| GB | 2153554 A * | 8/1985 | ......... | G05D 23/1904 |
| JP | 2013-119973 A | 6/2013 | | |
| JP | 2014-181846 A | 9/2014 | | |
| JP | 2017-223394 A | 12/2017 | | |
| WO | WO-9520134 A1 * | 7/1995 | ........... | F24D 10/003 |
| WO | WO 2007/136344 | 11/2007 | | |

\* cited by examiner

THERMAL ENERGY DISTRIBUTION SYSTEM AND CONTROL METHOD THEREOF

FIELD OF INVENTION

The invention relates to a method for controlling a thermal energy distribution system. The invention also relates to a thermal energy distribution system.

TECHNICAL BACKGROUND

Within the field of comfort heating/cooling, it is a well-known phenomenon that demand for comfort heating or cooling may be heavily dependent on outer factors. For example, demand for comfort heating may be higher on a cold day, or on a day with weather phenomena such as blizzards or rainstorms. Demand for comfort heating may decrease during holidays, when occupants of residential buildings typically gather in larger groups, thus occupying fewer residences. Events such as sporting events or parades may also cause occupants to leave their homes in large groups. A problem occurs when a peak in demand must be handled, as fast-acting heating systems may typically be more expensive and less environmentally friendly to run than their slower counterparts. For instance, oil or gas heaters may be faster to act than more environmentally friendly geothermal heating. Furthermore, it may be expensive to run said heaters at max capacity to compensate for the demand. Analogously for cooling systems, weather events such as very sunny days may drive demand for such services. For at least these reasons, there exists a need for a more efficient way to deliver comfort heating and/or cooling.

SUMMARY OF INVENTION

It is an object of the invention to at least mitigate some of the above mentioned problems. This object has been achieved by a method for controlling a thermal energy distribution system, the system comprising
- a distribution grid for a fluid based distribution of heat and/or cooling,
- one or more production plants for producing heat and/or cooling and for delivering the heat and/or the cooling to the distribution grid, and
- a plurality of local control units, each local control unit being associated with a local distribution system in a building, the local distribution system being configured to distribute comfort heating and/or comfort cooling in one or more buildings, each local control unit further being configured to control the outtake of heat of the associated local distribution system from the distribution grid, wherein the method comprises:
- determining forecast data pertaining to expected overall outtake of heat and/or cooling over time from the distribution grid by local distribution systems connected to the distribution grid, and to expected production capacity of heat and/or cooling in the one or more production plants,
- determining, at a control server, a time resolved control signal, the control signal being based on the forecast data and being associated with at least one of said local control units,
- sending the control signal from the control server to the associated local control unit,
- receiving the control signal at the associated local control unit, and
- regulating over time, in response to the control signal, the outtake of heat and/or cooling of the local distribution system from the distribution grid.

With this method, prediction of demand peaks due to environmental events, such as e.g. weather phenomena, and/or due to behaviour of the consumers, may be used to efficiently utilise heating or cooling facilities such as production plants in the local distribution system. It is e.g. possible to, in response to an expected peak in heat outtake for heating tap water at morning hours, send a control signal reducing the outtake of heat for comfort heating during the morning hours, thereby avoiding that an additional production plant must be activated. It is e.g. possible to temporarily reduce the heat outtake for comfort heating during a forecasted downtime for a production plant. By regulating the outtake of heat and/or cooling using forecast data and by using a time resolved control signal, it is possible to smoothing, or even cancelling out, the overall demand peaks perceived by the production plants. By using forecast data and using a time resolved control signal it is possible to reduce the requirements when it comes to the required frequency and required uptime of the communication between the control server and a local control unit. By having forecast data and regulating over time the outtake of heat and/or cooling, it is possible to reduce the number of times where an additional production plant must be activated. Moreover, since the method may smooth out the overall demand peaks as perceived by the production plants, the utilisation of the method may also prolong the time from the realisation that a demand peak larger than expected is about to necessitate activation of an additional production plant to the actual need to activate the additional production plant, thereby allowing for more environmentally friendly production plants with a slower response time to be started in response to the demand peak.

The forecast data may comprise information pertaining to a weather forecast. In this way, events such as storms, blizzards or heat waves may be compensated more efficiently.

The forecast data may comprise pre-recorded time resolved data pertaining to the overall outtake of heat and/or cooling of the local distribution systems from the distribution grid. This may allow for compensation of demand peaks which may be regular but difficult to predict, such as subtler weather variations not tied to particular or easily forecasted phenomena. This also allows for compensation of non-weather-related but regular phenomena such as working days, holidays, or irregular phenomena with similarities in the need for comfort heating/cooling, such as sporting events. It may be noted that some such pre-recorded time resolved data may be disconnected from weather data. It may e.g. relate to the overall difference in the overall heating and/or cooling need dependent upon if a day is a holiday or a working day. Some such data may be pre-recorded in association with weather data such that the time resolved control signal may be based on an association of the pre-recorded data and the weather forecast. It may e.g. take into account how a specific weather phenomenon may result in different overall outtake of heat and/or cooling dependent upon if the day is a holiday of a working day.

The forecast data further may comprise pre-recorded time resolved data pertaining to the outtake of heat and/or cooling of one or more specific local distribution systems from the distribution grid. This may allow compensation of demand peaks which are due to localized phenomena. For example, large shopping centres may have all-night campaigns or other similar events may occur which cause localized demand peaks. Such a demand peak may e.g. motivate local increase in supply of heating or cooling to that local distribution system and/or in a temporary decrease in outtake from surrounding local distribution systems. This pre-recorded time resolved data pertaining to the outtake of heat and/or cooling of one or more specific local distribution systems from the distribution grid may be disconnected from or associated with weather data similarly to how the pre-recorded time resolved data pertaining to the overall outtake of heat and/or cooling of the local distribution systems from the distribution grid may be disconnected from or associated with weather data.

The act of determining forecast data may comprise data pertaining to a type of building. The type of building may be one of; residential buildings, commercial buildings, free-standing houses or apartment buildings. Different types of buildings may react differently to each of the above mentioned phenomena. Thus, if it is known beforehand that e.g. blizzards affect free-standing houses more than apartment complexes, districts which are known to have a large number of free-standing houses may be allowed to draw heat from the distribution grid whereas the apartment complexes are controlled to temporarily reduce their heat outtake in case the forecast data pertaining to expected overall outtake of heat and to expected production capacity indicates that an additional production plant otherwise need to be deployed for a short time period.

The act of determining forecast data may, in addition or alternatively, comprise using historical consumption data from individual buildings. The act of determining forecast data may, in addition or alternatively, comprise using forecasted consumption data from individual buildings.

The method may further comprise determining a temperature outside the respective building, and each local control unit may be configured to control the associated local distribution system's outtake of heat from the distribution grid based on the determined temperature outside the respective building. This has the advantage of allowing for more efficient outtake of heat from the system.

The method may further comprise determining, at the respective local control unit, a base steering temperature for the associated local distribution system based on the determined temperature outside the building. In this way, the outtake may be adapted to the temperature outside the building. For example, if the temperature outside the building is relatively low, the outtake of heat may be relatively high, and correspondingly, if the temperature outside the building is relatively high, the outtake of heat may be relatively low. According to another example, if the temperature outside the building is relatively low, the outtake of cold may be relatively low, and correspondingly, if the temperature outside the building is relatively high, the outtake of cold may be relatively high.

The base steering temperature may be a set-point temperature for a regulator regulating the temperature of a feed of heat transfer fluid in the local distribution system.

The regulator may be any type of regulator suitable for regulating a temperature of a feed of heat transfer fluid. For example, the regulator may be a P, PI, PD, PID-controller or more advanced cascaded controllers. It will be appreciated that heat transfer fluid may be used both for transferring heat and cold. The regulator may in this way influence the local distribution system's outtake or use of heat or cold.

The control signal to the respective local control unit may comprise information pertaining to a temperature offset, and the method may further comprise determining a reduced steering temperature based on the determined temperature outside the building and on the temperature offset.

The reduced steering temperature may be determined at the at least one local control unit. The local control unit may e.g. determine a base steering temperature taking into account local factors, such as the determined temperature outside the building and a set desired indoor temperature, and then based on the received temperature offset determine a reduced steering temperature. The at least one local control unit may be configured to control the associated local distribution system's outtake of heat from the distribution grid based on the reduced steering temperature. Hence, the associated local distribution system's outtake of heat from the distribution grid may be reduced. This will lead to that a more uniform outtake of heat from the distribution grid may be achieved. Further, at high demand of heat outtake from the distribution grid it may be safeguarded that most, or all, local distribution systems may get at least some heat or alternatively that they may share heat by being allowed to draw heat from the distribution grid at different times. The same apply for outtake of cold from the distribution grid.

The time resolved control signal may be sent periodically. In this manner, the method may strike a balance between relying on more up-to-date forecasts and minimizing the communication between the control server and the local control unit.

The time resolved control signal may have a time length being longer than the period between sending of time resolved control signals, preferably at least 5 times longer. This enables for increased efficiency even if e.g. contact is broken with a server responsible for sending the control signal, as a less recent forecast is in most cases still better than a return to a non-predictive method of power steering.

The method for controlling a thermal energy distribution system may in short be said to comprise: determining forecast data pertaining to expected overall outtake of heat and/or cooling over time from a distribution grid by local distribution systems connected to the distribution grid, and to expected production capacity of heat and/or cooling in one or more production plants, determining, at a control server, a time resolved control signal, the control signal being based on forecast data and being associated with at least one local control unit, sending the control signal from the control server to the associated local control unit, receiving the control signal at the associated local control unit, and regulating over time, in response to the control signal, the outtake of heat and/or cooling of the local distribution system from the distribution grid.

Further, a thermal energy distribution system is provided. The system comprising:
 a distribution grid for a fluid based distribution of heat and/or cooling,
 one or more production plants for producing heat and/or cooling and for delivering the heat and/or the cooling to the distribution grid,
 a plurality of local control units, each local control unit being associated with a local distribution system in a building, the local distribution system being configured to distribute comfort heating and/or comfort cooling in one or more buildings, each local control unit further being configured to control the outtake of heat of the associated local distribution system from the distribution grid,
 a forecast server configured to determine forecast data pertaining to expected overall outtake of heat and/or cooling over time from the distribution grid by local distribution systems connected to the distribution grid, and pertaining to expected production capacity of heat and/or cooling in the one or more production plants, a control server, configured to determine a time resolved control signal, the control signal being based on the forecast data and being associated with at least one of said local control units, a transmitter, configured to send the control signal from the control server, a receiver, configured to receive the control signal, and a regulator, configured to regulate the outtake of heat and/or cooling of the local distribution system from the distribution grid.

The above mentioned features of the method, when applicable, apply to the thermal energy distribution system as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

DETAILED DESCRIPTION OF PREFERRED EMBODIMENTS

The invention will by way of example be described in more detail with reference to the appended schematic drawings, which shows a presently preferred embodiment of the invention.

Figure 1:
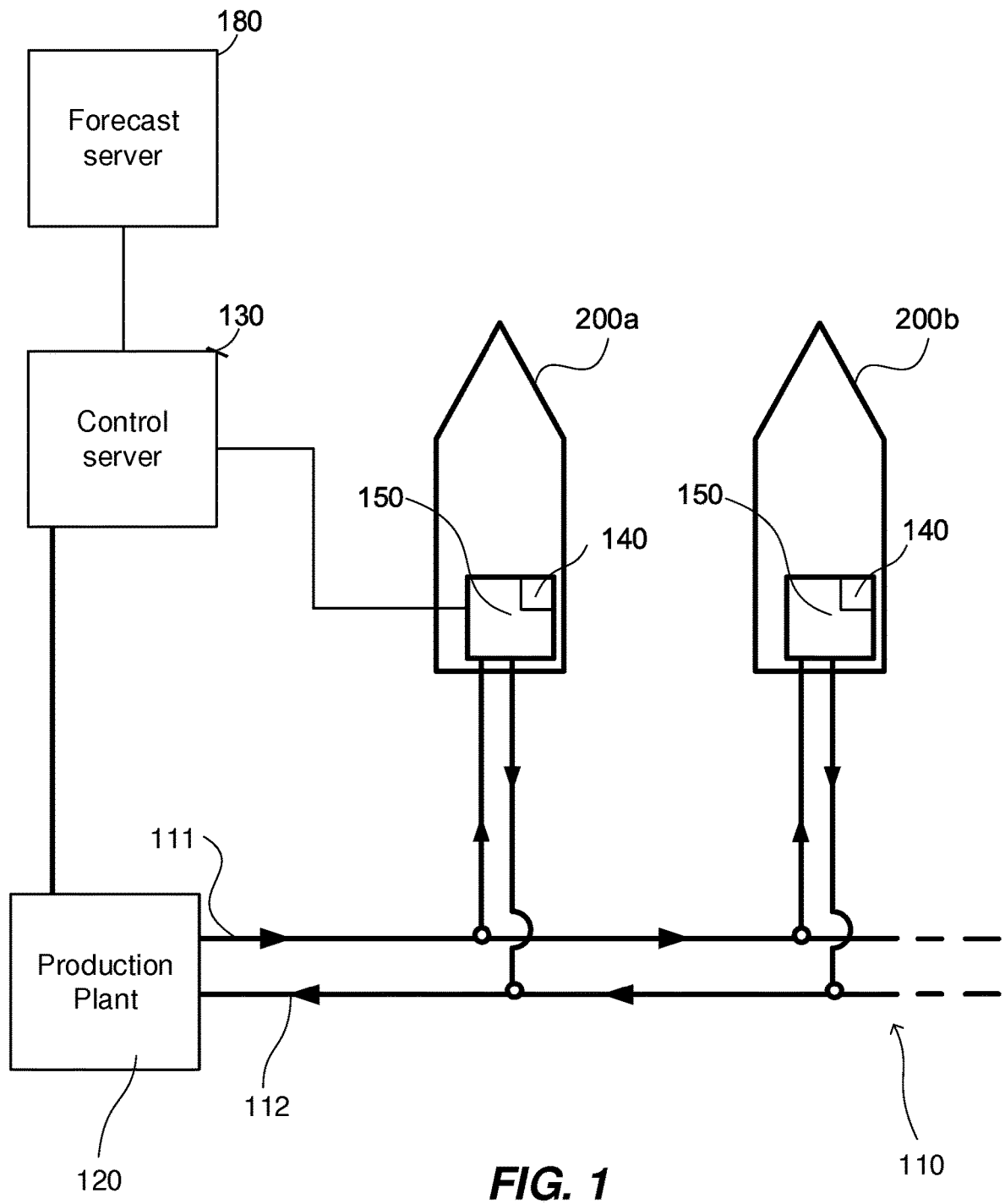
FIG. 1 is a schematic drawing of a thermal energy distribution system.

FIG. 1 shows a thermal energy distribution system, comprising a thermal energy distribution grid 110 and a production plant 120. The distribution grid 110 comprises a main line 111 providing heating or cooling medium from the production plant 120 and a return line 112 which transports heating or cooling medium to the production plant 120. The heating or cooling medium may be any fluid suitable for heating or cooling at a production plant 120 and transported by means of the main line 111 and return line 112, such as water. The heating or cooling medium will henceforth be referred to as "thermal fluid". The production plant 120 may be a geothermal plant, an electrically powered plant for heating or cooling fluids, or may be driven by combustion of fuels, such as gas or oil. It is only important that the production plant 120 is configured to heat or cool the heating or cooling medium and pump it through the distribution grid 110. The distribution grid 110 may comprise more than one production plant 120. The thermal energy grid 110 is connected to a building 200a, 200b. The buildings 200a, 200b are located at different distances to the production plant 120. The building 200 may be any type of building suitable for connection to a thermal energy grid 110, such as a residential building, commercial or office building, an apartment building, a free-standing house or an industrial building.

The thermal energy distribution system comprises a local distribution system 150 connected to the building 200. The local distribution system 150 is configured to distribute heating or cooling inside the building 200, and may comprise radiators, air conditioning units and other devices configured to regulate the temperature inside the building 200. The local distribution system 150 can serve a plurality of buildings 200 or one building 200. The local distribution system 150 may be located inside of the building 200. The local distribution system 150 may be located at least partly outside of the building 200. The local distribution system 150 is associated with a local control unit 140. The local control unit 140 is configured to regulate the outtake of heating or cooling from the distribution grid 110 to the building 200.

Figure 2:
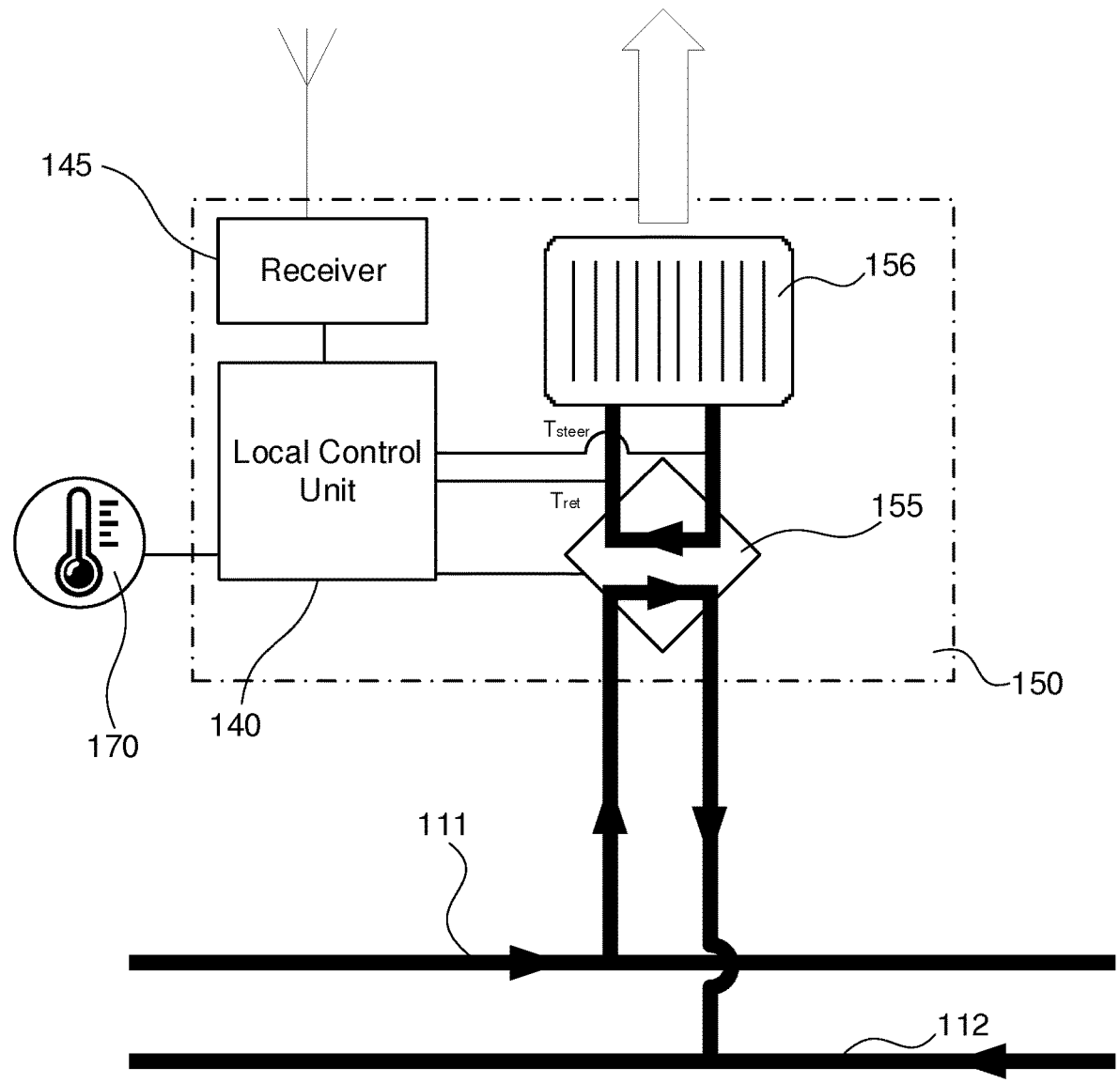
FIG. 2 is a schematic drawing of a local distribution system in a thermal energy distribution system.

The local distribution system 150 is shown in more detail in FIG. 2. Thermal fluid flows from the main line 111 into a heat/cold extractor 155. The heat/cold extractor 155 may be a heat exchanger. Alternatively, the heat extractor 155 may be a heat pump. The heat/cold extractor 155 is configured to extract heat/cold from the thermal fluid flow of the main line 111. The heat/cold extractor 155 is configured to deposit the, from the thermal fluid flow of the main line 111, extracted heat/cold to local thermal fluid of the local distribution system 150. The local thermal fluid of the local distribution system 150 is pumped through a thermal element 156, such as a radiator or air conditioning unit. The thermal element 156 may be any device adapted to heat or cool air inside the building 200. A local control unit 140 is connected to a pair of thermal sensors (not pictured), adapted to sense the steering temperature $T_{steer}$ of the thermal fluid circulating into the thermal element 156, and to sense the return temperature $T_{ret}$ of the thermal fluid circulating out of the thermal element 156. The local control unit 140 uses the steering temperature $T_{steer}$ and the return temperature $T_{ret}$ to regulate the heat exchanger 155 so as to heat or cool the building 200 to the desired temperature. The regulation is done by way of a regulator (not pictured), such as a valve regulating the flow of thermal fluid through the thermal element 156. A thermometer 170 is also connected to the local control unit 140. The thermometer 170 measures an ambient temperature outside the building 200, which the local control unit 140 can use for more precise regulation of the temperature inside the building 200. The local control unit 140 establishes a base steering temperature $T_{steer}$ to be used as a set-point temperature. The regulation is done by means of determining a temperature offset between the set-point temperature and the desired temperature. The offset may be a temperature value to be added to the set-point temperature. This temperature value may be positive or negative, reflecting a desire for heating or cooling in the building 200. The offset may also be a percentage value to be applied to the set-point temperature. A reduced steering temperature is determined based on the set-point temperature and the temperature outside the building, and the temperature offset. This reduced steering temperature is used to control the regulator. The regulation of temperature inside the building 200 can of course be done in a different manner, as long as it may be controlled by way of a regulator.

FIG. 1 further depicts a forecast server 180. The forecast server 180 is configured to determine forecast data about predicted events which may affect use of the thermal energy distribution grid 110 by the building 200. Such events may be for example weather events. They may also be events where a prediction of a large number of people entering or leaving the building may affect the use of the distribution grid 110 by the building, such as sporting events, national holidays, shopping events or the like. The forecast server 180 also determines data pertaining to historical outtake of thermal fluid from the distribution grid 110. This may for example be done by examining historical records and performing estimations based on these. For example, if outtake from the delivery grid 110 has been 20% higher than normal on Christmas eve for the past 5 years, the forecast server 180 may determine forecast data to the effect that the outtake will be 20% higher on Christmas eve in the current year as well. This is merely an example, and the forecast data may be generated by any method with any level of sophistication so long as it pertains to an expected outtake of thermal fluid from the distribution grid 110 and/or to an expected capacity of the production plant 120. The historical data may pertain to outtake of specific local control units 140 connected to the distribution grid 110 as well as overall outtake from the distribution grid 110. The forecast data may comprise information of the type of the building 200. This information may be of value, as certain weather events may affect one type of building heavily but not others. For instance, a shopping mall may see a significant decrease in visitors due to expected heavy rain, and thus require an increased outtake of heat from the distribution grid 110. This due to that less people will most likely visit the shopping mall. With less people in the shopping mall the people themselves will not heat the shopping mall themselves and additional heating is needed to make the indoor climate pleasant for the clients being present in the shopping mall.

The building 200, the production plant 120 and the forecast server 180 are all connected to a control server 130. The control server 130 is adapted to receive readings from the local distribution system 150 and the forecast server 180. The control server 130 is configured to determine a time resolved control signal, which is transmitted to a regulator (not pictured) inside the building 200 by way of a transmitter (not pictured). The readings are received in the local distribution system by a receiver 145. The time resolved control signal can for example be a data array containing input values to the local control unit 140. The local control unit 140 would in that case use the next value in the data array to adjust the temperature inside the building 200 for example every hour, if the time resolution of the control signal was hourly. The time resolution of the control signal may be by minute, second, day or any other time frame suitable for use with thermal control systems, in which case the local control unit 140 adjusts the temperature with a frequency according to the time resolution.

The control server 130 uses forecast data from the forecast server 180 as well as other inputs to generate the time resolved control signal. Such other inputs may for example be the desired temperature inside the building 200, a capacity of the production plant 120, weather data, energy level of accumulators, ground/soil temperature, wind prediction data, geographic positioning data, electricity consumption or other parameters. The forecast data may be used in several different ways. One possibility is that if an increase in outtake of e.g. hot tap water is anticipated, the outtake from the distribution grid 110 may be reduced slightly beforehand, meaning that demands of heated water will be more readily available when the need arises. If an increase in outtake of comfort heating or cooling is anticipated, for instance for a time period when the sun strikes the building 200 at a certain angle or when the people return home from work to the building 200, the local control unit 140 may instead increase outtake from the distribution grid 110 slightly beforehand, so that the desired temperature is reached by the time the peak is anticipated but avoiding a sudden outtake from the distribution grid 110.

According to an example, when an increase in outtake of comfort heating is anticipated the local control unit 140 may increase outtake for heat from the distribution grid 110 for heating water in accumulator tanks for hot tap water so that the water is heated to its maximum slightly beforehand the increase in outtake of comfort heating is anticipated. According to this example, a reduction of heat outtake for hot tap water production during the increased outtake of comfort heating may be achieved. Hence, lowering the total demand of heat outtake from the distribution grid 110 during the anticipated increased outtake of comfort heating.

If the production plant 120 malfunctions in some way such that production is decreased, the control server 130 may adjust the time resolved control signals to different local distribution systems 150 and thus coordinate the outtake from the distribution system 110 such that it is shared more evenly across the buildings 200a, 200b. This contributes to the capacity of the production plant 120 being shared more fairly across several buildings 200a, 200b, each building experiencing a smaller drop in comfort heating or cooling. This is as opposed to buildings 200b located far away from the production plant 120 experiencing a severe drop in outtake while buildings 200a close to the production plant 120 experience a less severe drop in outtake.

The control server 130 calculates a time resolved control signal for the local control unit 140 for a certain time period, for example a week. However, the control server 130 may update the local control unit 140 with a new time resolved control signal more often than this, for instance every day. This contributes to new information being used in a timely manner while avoiding unnecessary communication between the local control unit 140 and the control server 130.

Figure 3:
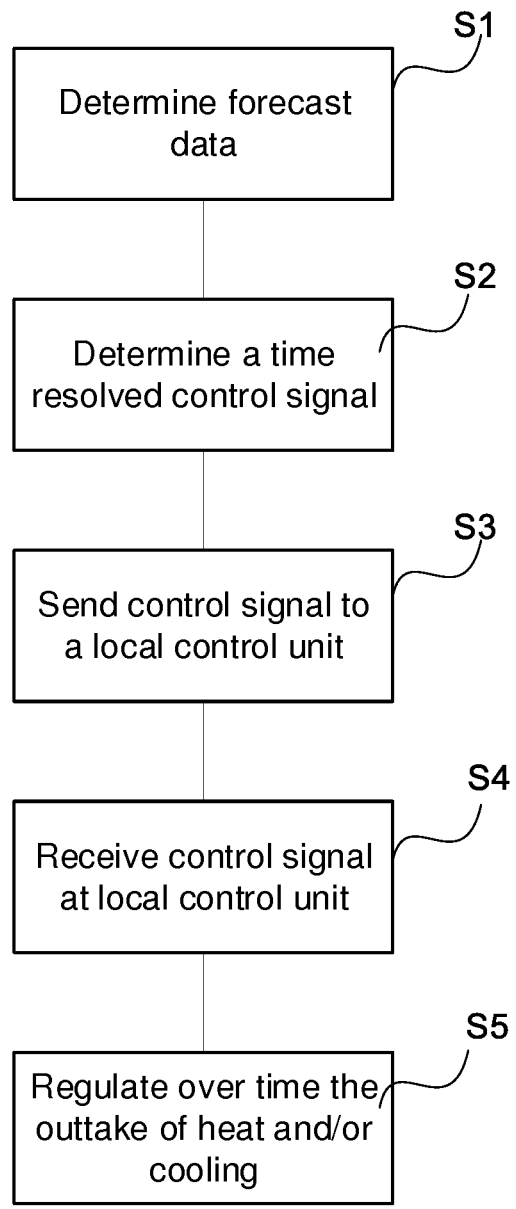
FIG. 3 is a schematic of a method for controlling a thermal energy distribution system.

Based on the above, a method for controlling the thermal energy distribution system 110 can be performed. First, forecast data is determined S1. The data is sent to the control server 130 where a time resolved control signal is determined S2. The control signal is sent S3 from the control server 130 to the local control unit 140, where it is received S4. The local control unit 140 regulates S5 over time the outtake of heat and/or cooling of the local distribution system 150 from the distribution grid 110. FIG. 3 shows a flow diagram for such a method.

It is contemplated that there are numerous modifications of the embodiments described herein, which are still within the scope of the invention as defined by the appended claims.

It may e.g. be noted that the local distribution system 150 may comprise more than one building 200, e.g. by the addition of more heat pumps 150 and thermal elements 156 to the building 200. Also, the local distribution system 150 may be connected to more than one building 200.

The invention claimed is:

1. A method for controlling a thermal energy distribution system, the thermal energy distribution system comprising:
    a distribution grid for a fluid based distribution of heating and/or cooling,
    one or more production plants for producing the heating and/or cooling and for delivering the heating and/or cooling to the distribution grid, and
    a plurality of local control units, wherein each local control unit is associated with a local distribution system in a building, the local distribution system being configured to distribute the heating and/or cooling in one or more buildings, and wherein each local control unit is further configured to control an outtake of the heating and/or cooling of the associated local distribution system from the distribution grid, wherein the method comprises:
        determining forecast data pertaining to an expected overall outtake of the heating and/or cooling over time from the distribution grid by local distribution systems connected to the distribution grid, and to expected production capacity of the heating and/or cooling in the one or more production plants;
        determining, at a control server, a time resolved control signal, the time resolved control signal being based on the forecast data and being associated with at least one local control unit of the plurality of local control units, wherein the time resolved control signal comprises information pertaining to a temperature offset;
        sending the time resolved control signal from the control server to the at least one local control unit of the plurality of local control units,
        receiving the time resolved control signal at the at least one local control unit of the plurality of local control units;
        determining, at the at least one local control unit of the plurality of local control units, a respective base steering temperature for the associated local distribution system based on a temperature outside of a respective building;
        determining, at the at least one local control unit of the plurality of local control units, a respective steering temperature based on the respective base steering temperature and on the temperature offset of the time resolved control signal; and
        regulating over time, based on the determined respective steering temperature, the outtake of the heating and/or cooling of the associated local distribution system from the distribution grid.

2. The method according to claim 1, wherein the forecast data comprises information pertaining to a weather forecast.

3. The method according to claim 1, wherein the forecast data comprises pre-recorded time resolved data pertaining to the expected overall outtake of the heating and/or cooling of the local distribution systems from the distribution grid.

4. The method according to claim 1, wherein the forecast data further comprises pre-recorded time resolved data pertaining to an outtake of heating and/or cooling of one or more specific local distribution systems from the distribution grid.

5. The method according to claim 1, wherein determining forecast data comprises determining data pertaining to a type of building.

6. The method according to claim 1, wherein the time resolved control signal is sent periodically.

7. The method according to claim 6, wherein the time resolved control signal has a time length being longer than a period between sending of the time resolved control signals.

8. The method according to claim 1, wherein the time resolved control signal is configured to initiate a change in delivery of the heating and/or cooling in advance of a predicted rise in demand.

9. A thermal energy distribution system, the thermal energy distribution system comprising:
    a distribution grid for a fluid based distribution of heating and/or cooling,
    one or more production plants for producing the heating and/or cooling and for delivering the heating and/or cooling to the distribution grid,
    a plurality of local control units, wherein each local control unit is associated with a local distribution system in a building, the local distribution system being configured to distribute the heating and/or cooling in one or more buildings, and wherein each local control unit is further configured to control an outtake of the heating and/or cooling of the associated local distribution system from the distribution grid,
    a forecast server configured to determine forecast data pertaining to an expected overall outtake of the heating and/or cooling over time from the distribution grid by local distribution systems connected to the distribution grid, and pertaining to expected production capacity of the heating and/or cooling in the one or more production plants,
    a control server, configured to determine a time resolved control signal, the time resolved control signal being based on the forecast data and being associated with at least one local control unit of the plurality of local control units, wherein the time resolved control signal comprises information pertaining to a temperature offset, and
    the control server comprising a transmitter, configured to send the time resolved control signal from the control server, wherein each local control unit comprises:
        a receiver, configured to receive the time resolved control signal sent from the control server, and
        a regulator configured to determine a base steering temperature based on a temperature outside of the building of the local distribution system controlled by the local control unit, to determine a steering temperature based on the base steering temperature and on the temperature offset of the received time resolved control signal, and to regulate an outtake of heat and/or cooling of the local distribution system from the distribution grid based on the determined steering temperature.

10. The method according to claim 6, wherein the time resolved control signal has a time length being at least 5 times longer than a period between sending of the time resolved control signals.

* * * * *